US 8,179,556 B2

(12) United States Patent
Salgado et al.

(10) Patent No.: US 8,179,556 B2
(45) Date of Patent: May 15, 2012

(54) MASKING OF TEXT IN DOCUMENT REPRODUCTION

(75) Inventors: David L. Salgado, Victor, NY (US); Francois Ragnet, Venon (FR); Douglas J. Tallinger, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1450 days.

(21) Appl. No.: 11/728,450

(22) Filed: Mar. 26, 2007

(65) Prior Publication Data
US 2008/0239365 A1 Oct. 2, 2008

(51) Int. Cl.
*G06K 15/00* (2006.01)
*G06K 9/72* (2006.01)

(52) U.S. Cl. ....... 358/1.18; 358/452; 358/1.9; 358/1.14; 358/1.15; 382/218; 382/229; 713/193

(58) Field of Classification Search .................. 358/1.9, 358/1.13, 1.14, 1.15, 448, 474, 452, 1.18; 399/366; 382/83, 309–311, 321, 190, 218, 382/231, 229; 713/193
See application file for complete search history.

(56) References Cited

U.S. PATENT DOCUMENTS

| | | | | |
|---|---|---|---|---|
| 4,777,510 A * | 10/1988 | Russel | ........................... | 399/184 |
| 4,862,217 A * | 8/1989 | Russel | ........................... | 399/184 |
| 5,048,109 A * | 9/1991 | Bloomberg et al. | ........... | 382/164 |
| 5,649,024 A * | 7/1997 | Goldsmith | ..................... | 382/170 |
| 6,067,555 A * | 5/2000 | Hayashi | ......................... | 715/234 |
| 6,240,215 B1 | 5/2001 | Salgado et al. | | |
| 6,411,314 B1 * | 6/2002 | Hansen et al. | ................. | 715/769 |
| 6,671,684 B1 * | 12/2003 | Hull et al. | .............................. | 1/1 |
| 6,707,568 B1 * | 3/2004 | Yu | ................................. | 358/1.15 |
| 7,236,653 B2 * | 6/2007 | Constantin et al. | ........... | 382/306 |
| 7,423,769 B2 * | 9/2008 | Yu | ................................... | 358/1.1 |
| 7,456,983 B2 * | 11/2008 | Meador et al. | ................ | 358/1.14 |
| 7,512,985 B1 * | 3/2009 | Grabarnik et al. | ............... | 726/26 |
| 7,577,295 B2 * | 8/2009 | Constantin et al. | ........... | 382/175 |
| 7,724,918 B2 * | 5/2010 | Balakrishnan et al. | ........ | 382/100 |
| 7,812,860 B2 * | 10/2010 | King et al. | ............... | 348/210.99 |
| 7,830,537 B2 * | 11/2010 | Beadle et al. | ................. | 358/1.14 |
| 2004/0139391 A1 * | 7/2004 | Stumbo et al. | ................. | 715/512 |
| 2004/0227758 A1 * | 11/2004 | Curry et al. | .................... | 345/426 |
| 2005/0002053 A1 * | 1/2005 | Meador et al. | ................ | 358/1.14 |
| 2006/0062453 A1 * | 3/2006 | Schacht | ......................... | 382/164 |
| 2007/0139723 A1 * | 6/2007 | Beadle et al. | ................. | 358/448 |
| 2007/0183000 A1 * | 8/2007 | Eisen et al. | .................... | 358/452 |
| 2007/0279672 A1 * | 12/2007 | Harada | ......................... | 358/1.14 |
| 2008/0002911 A1 * | 1/2008 | Eisen et al. | .................... | 382/283 |
| 2008/0291495 A1 * | 11/2008 | Yu | ................................. | 358/1.15 |
| 2009/0092317 A1 * | 4/2009 | Nagarajan et al. | ............. | 382/173 |
| 2010/0182653 A1 * | 7/2010 | Ireland et al. | ................. | 358/474 |
| 2010/0329555 A1 * | 12/2010 | Chapman et al. | ............. | 382/167 |

OTHER PUBLICATIONS

U.S. Appl. No. 11/296,396, filed Dec. 8, 2005, Salgado, et al.

* cited by examiner

*Primary Examiner* — Twyler Haskins
*Assistant Examiner* — Dennis Dicker
(74) *Attorney, Agent, or Firm* — Fay Sharpe LLP

(57) ABSTRACT

An apparatus for masking text in a rendered copy of an original document includes a text modification system which is configured to receive a print job from an application and modify the print job in accordance with a print job description, whereby when rendered on an output device, a selected text element is masked. A user interface is configured to receive instructions from a user to build the print job description including instructions for selecting text elements to be masked.

10 Claims, 3 Drawing Sheets

MASKING OF TEXT IN DOCUMENT REPRODUCTION

CROSS REFERENCE TO RELATED PATENTS AND APPLICATIONS

The following copending application, the disclosure of which is incorporated herein in its entirety by reference, is mentioned:

U.S. application Ser. No. 11/296,396, filed Dec. 8, 2005, entitled METHOD AND SYSTEM FOR COLOR HIGHLIGHTING OF TEXT, by Salgado, et al.

BACKGROUND

The exemplary embodiment relates to the reproduction of documents, either in hardcopy or digital form. It finds particular application in connection with a system and method for masking portions of text in the reproduced document, without altering the original document.

There are many instances where a user wishes to reproduce a digital or hardcopy document for viewing by a recipient while masking certain sensitive information in the document. For example, legal documents may be masked to redact confidential client information before distribution to others. Medical records may be made available to researchers with patient information masked. Business records relating to multiple employees may be masked to remove information about other employees before distribution to individual employees. Financial records may be masked to hide sensitive information. Typically, the masking involves whiting out the sensitive information with ink from a correction pen or applying cover-up tape to a hardcopy of the document and then making a further copy. This process can be time consuming, particularly when a large number of documents are to be processed. Additionally, it requires making a copy of the original and another of the masked copy to ensure that the original document remains unaltered and that sensitive information cannot be identified simply by removing a portion of the correction tape or ink on the copy. Further, where a large number of items are to be masked, confidentiality may be compromised when even a single item is accidentally missed.

BRIEF DESCRIPTION

In accordance with one aspect of the exemplary embodiment, an apparatus for masking text in a rendered copy of an original document is provided. The apparatus includes a text modification system which is configured to receive a print job from an application and modify the print job in accordance with a print job description, whereby when rendered on an output device, a selected text element is masked. A user interface is configured to receive instructions from a user to build the print job description, including instructions for selecting text elements to be masked.

In accordance with another aspect, a method for masking text in an output document includes providing a print job, providing a print job description for the print job, the print job description including instructions for selecting text elements to be masked, modifying the print job in accordance with the print job description, and rendering the modified print job on an output device, whereby a selected text element is masked.

In accordance with another aspect, a method for masking text in a document includes generating a print job for printing an original document, receiving instructions on a user interface for identifying selected text elements to be masked when the print job is printed, building a print job description for the print job, the print job description including instructions for modifying the print job to mask the selecting text elements, modifying the print job in accordance with the print job description, and rendering the modified print job on an print engine, whereby the selected text elements are masked.

DETAILED DESCRIPTION

Aspects of the exemplary embodiment relate to a system and a method for masking portions of an original document in the preparation of a digital copy or hardcopy of the document. This provides a user with the ability to print a document with text or other information masked in color on an electronic reprographic system or to permit display of a scanned document with masks over sensitive or irrelevant areas of text, without modifying the original document. With the exemplary system, a number of "text elements," which may be matched through advanced linguistic processing and rules, identified from specialized dictionaries, or identified by a user, can be masked with a specific color.

Copending application Ser. No. 11/296,396, incorporated herein in its entirety by reference, discloses methods for identifying text elements in a data stream of a print job which may be employed herein for identifying text elements for masking.

Figure 1:
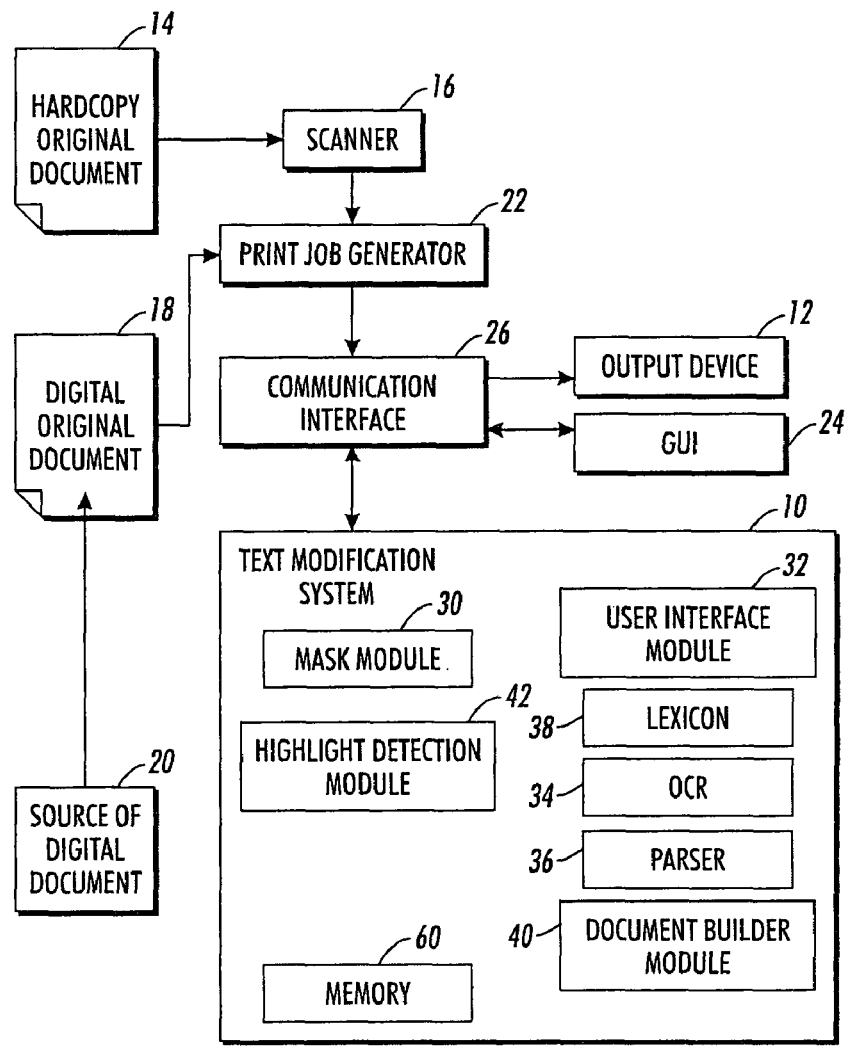
FIG. 1 is a functional block diagram of a system for masking text in accordance with the exemplary embodiment.

With reference to FIG. 1, an exemplary environment in which a text modification system 10 for masking text operates, is shown. The system 10 applies one or more masks to a print job generated from an original document. The modified print job thus produced may be rendered on a suitable output device 12.

In one embodiment, the output device 12 includes a print engine which renders the modified digital copy in hardcopy form by printing the print job on print media using colorants, such as inks or toners. Suitable output devices of this type include copiers, facsimile machines, bookmaking machines, multifunction devices, and the like. The print engine may be embodied, for example, in a standalone printer, a network printer, a network copier, network scanner or some combination thereof. The print engine may support color printing to obtain full color masking. For monochromatic printing devices, the masked text may be grayscaled to simulate a masking color. Alternatively, the mask may comprise a space in the output text which has a size and shape comparable to that of the masked text element. In the output document, the masked text is obscured from view.

Print media can be any physical sheet of paper, plastic, or other suitable physical print media substrate for images. In another embodiment, the output device 12 includes a visual display, such as a color monitor, which provides an on-screen image of the modified digital copy. In either case, the recipient of the output copy which is displayed or printed is able to view the content of the original document, with certain selected portions masked from view.

The original document may be a hardcopy document 14 which includes text and other information on print media. In this case, the original document may be captured with a suitable capture device 16, such as an optical scanner, which generates image data comprising a digital copy of the original hardcopy document. Or, the original document may be a digital document 18, such a print ready document (e.g., PDF file) stored on a data storage device 20, such as a personal computer, print server, or other source of digital documents. In either case, a job generator 22 may receive the image data and generate a print job in suitable native format for rendering on the output device 12. A user interface 24, such as a graphical user interface (GUI) allows a user to interface with the job generator for creating/modifying a job description for the printjob. The job description identifies text elements to be masked, either by specifying the specific text elements or by providing instructions whereby selected text elements are identifiable. The various components may communicate via a communication interface 26.

The output masked document can be a printed document or a digital document. In the case of a digital document, it may be stored in electronic form for subsequent viewing on a display or made available, for example, as web pages.

The printjob generator 22 generates a print job (a job in suitable format to be recognized by the selected output device) and may be an application program such as word processing, a spreadsheet, presentation software application program or other type of similar software application. The job generator 22 may execute on a personal computer, workstation, handheld device or other similar type of computing platform (not shown). In yet other embodiments, the printjob generator 22 may be embodied in a device comprising a print engine, such as a copier, facsimile, or other type of output device that generates output onto a medium, e.g., paper, transparency, etc. A print job data stream may be a file that is in the native format of the print engine, e.g., PDF™ Postscript™, PCL™, HPCL™, Adobe™, etc. The print engine 12 may be configured to generate a hardcopy output from the print job data streams transmitted by the job generator 22. The print job generator 22 may also be configured to transmit a print job data stream in the native format of the print engine. The print job stream may be formed by the interaction between the job generator 22 and the underlying operating system of the computing platform. For example, a print driver may issue the print job data stream in response to a user initiating a print command in the print job generator 22.

The communication interface 26 may be configured to provide a communication channel between the job generator 22, the print engine or other output device and the system 10 for the transmission of data. The communication interface 26 may be implemented using a wired network, a wireless network, or a combination thereof. The communication interface 26 may also include dedicated cable line, local area network, a wide area network or some combination thereof.

The text modification system 10 receives the print job data stream from the print job generator 22 in its native format and modifies the data stream to mask selected text elements in accordance with a print job description. During the process of masking, the print job stream may be converted to a meta format which is subsequently returned to the native format prior to being transmitted to the output device 12. The illustrated system 10 includes a mask module 30, which applies a mask to selected text elements, and one or more of a user interface module 32, an optical character recognition (OCR) engine 34, a parser module 36, a lexicon 38, a document builder module 40, and a highlight detection module 42.

Figure 2:
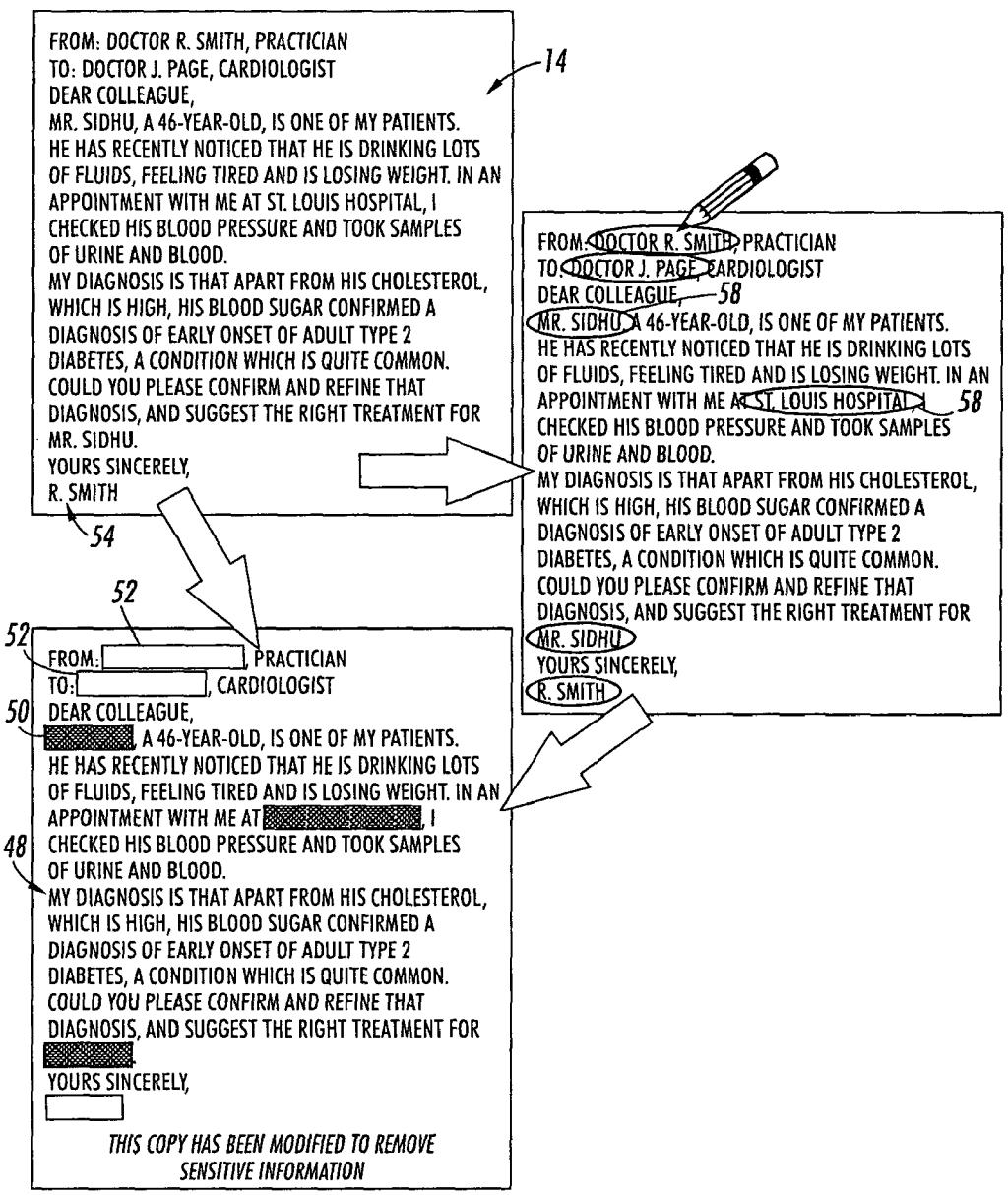
FIG. 2 is a schematic illustration of the incorporation of masks into a document.

As illustrated in FIG. 2, the mask may be visually apparent in the output document 48. Two types of masking are contemplated: overlay and replacement. In applying the mask, therefore, the textual element to be masked may be removed from the digital copy of the original document and replaced with a mask of the same size and shape, or may simply be overlaid with a mask layer (e.g., in the case of a hardcopy output document 48). For example, the mask may appear as a rectangular opaque strip 50 of color which contrasts with the background color of the document, e.g., a red or black strip. Or the mask may be in the same color as the background, such as a white strip 52. The reader may, however, be aware that a text element is masked, either because of the readily visible strip of color or because of an apparent blank space within the document text. While rectangular strips are shown, it will be appreciated that the mask 50, 52 can be any shape or size to fully obliterate or obfuscate the selected textual element 54 such that its content is not discernable to the reader. In general, the mask, whether it be colored or a space, is sized such that the layout of the output document is the same, except for the presence of masks, as it would be for the document output without the masks. In this way, the remaining, unmasked text is on the same lines and in substantially the same position on the page as it would be in the unmasked document.

The text elements 54 to be masked may include any alpha/numeric fragments of text, such as words, phrases, sentences, paragraphs, numbers, as well as single characters. In general the characters of the text elements 54 form a part of a finite alphabet of characters which is recognized by the system 10.

The mask module 30 of the modification system 10 applies a mask to a selected text element in the print job data stream in accordance with a print job description which, when rendered, masks the selected text element. At this stage, the mask may be in the form of instructions embedded within or associated with, the print job stream.

In some cases, the print job may include image content as well as or in place of text content, such as when an original document has been scanned. In such cases, the OCR module 34 may include software which extracts textual information from the image content of the print job. Typical OCR engines operate based on a pattern recognition algorithm or algorithms which identify characters based on matching with expected character shapes. To resolve uncertainties in recognition, the OCR module optionally utilizes additional information or post-conversion processing such as a spelling checker, a grammar checker, and the like. The OCR engine 34 may receive a submitted print job data stream and may convert image data into text data via optical character recognition as well as providing layout information.

The lexicon 38 may be a finite state device which serves as a dictionary whereby specific textual elements in the print job data stream or OCR'd text may be identified for masking. The lexicon may include words, phrases and the like, including person names, place names and other specific text elements of interest to the user. The lexicon may also be structured to identify lexical equivalents, such as abbreviations, lemma forms, and the like of user-selected textual elements. The lexicon may also cluster textual elements according to category, whereby a specific category of textual elements may be selected for masking (such as place names, people names, dates, obscene language, and the like). Each category contains a list of pre-determined terms that are relevant for the category. Some of the categories may be user defined categories, for example, a user may use a category feature in the GUI to select terms for a category. In general, the lexicon may operate independently of the font used in the document, although in some instances, specific fonts may be selected for masking.

The user interface module 32 allows a user to interact with the system 10, e.g., via user interface 24. The user interface 24 may include a visual display and a user entry device, such as a keyboard, cursor control device, and/or touch screen, to provide a user with the ability to enter text and to select mask options for selected textual elements. In various embodiments, the GUI 24 may be a component of the job generator, scanner, or output device. In other embodiments, the GUI may be at a remote location, e.g., embodied in a workstation, a wireless handheld device, or other remote computing platform.

The user interface module 32 may be configured to enable a user to specify any modifications, such as text masking, to a submitted print job. The user interface module 32 may then build a print job description for the submitted print job data stream which has been supplied to the system 10.

The GUI 24 allows the user to specify the manner in which selected text elements are to be masked, e.g., by removal or layering, and whether the mask is to be colored or white/transparent. In certain embodiments, a copy variation list may be built that provides the capability to permit a user to select the same text element to be masked in different colors for different sheets of media in the media output. In yet other embodiments, the text element may be masked in a consistent manner throughout the print job. The GUI 24 may also allow a user to specify rules for identifying the text elements to be masked. In one embodiment the rule is specified by typing or highlighting on a screen display of the document, selecting from a displayed menu, or otherwise selecting the specific text element to be masked. In other embodiments, the user may select a category of text elements to be masked. In yet other embodiments, where a user has highlighted text elements to be masked on the hardcopy document before scanning of the document, the user interface allows the user to identify the color of the ink used in the highlighting process whereby the highlighted text elements can be identified. For example, as shown in FIG. 2, the user has highlighted text elements in an original document or copy thereof 56 with highlighting marks 58. The GUI also allows the user to select recipient-specific rules, whereby different text elements are masked for different recipients or classes of recipients. All of these mask related instructions may be incorporated into the print job description sent to the system 10.

In one embodiment, a user uses the GUI 24 to access the lexicon 38 to select textual elements or categories for masking. For example, when a category option is selected, the system 10 may be configured to search a submitted print job for terms relevant to the selected category. For example, if a date category is selected, the system 10 identifies all the date text in the document by comparing the data stream with the lexicon 38 and may automatically tag the date text for masking. Alternatively, the date text may be highlighted or otherwise accented whereby a user can select one or more of the accented text elements for masking.

The parser module 36 may be configured to parse the print job data stream in the native language of the print job according to the submitted print job description and identify text fragments for masking. The parser may also be configured to delimitate the color masking rules settings within the print job data stream. After processing the job stream, the parser module may then forward the transformed job stream in a metaformat to the mask module 30.

The mask module 30 of the system 10 may be configured to bypass any action on un-delimited information contained in the print job data stream. The mask module 30 may also be configured to remove the delimiters and execute its rules processor on any delimited text. For the delimited text, the mask module 30 executes its rules per a recipient's specified settings as set by the print job description. The mask module 30 may be configured to strip out the text delimiters, analyze the text against the masking rules, and add masking delimiters to the print job where appropriate. For example, the mask delimiters may include information on what mask color should be applied. The mask module 30 may use a memory buffer for temporary storage of text information as it scans and processes the text. After processing the job stream, the mask module 30 may forward the document to the document builder module 40.

The mask module 30 may also be configured to extract and load the masking rules associated with the print job description. In some embodiments, rules associated with a print job description may relate to any user-specified text to be masked, a color for masking the user-specified text, or some other modification to the text. For example, a user may have selected to mask all date references in a red color. The color mask module may be further configured to parse the print job data stream in response to any loaded rules. For the appropriate text, the mask module may delimitate any color masking rule and any selected text as specified in the print job description.

In some embodiments, some of the mask rules are recipient-specific or output device specific. For example, a particular recipient may have permission to access some information but not others. The recipient may be required to enter a password or other access information prior to viewing or printing the masked document. Depend on the recipient's or output device's permissions, various items may be visible or hidden to the user.

Instructions for masking or otherwise modifying text elements may be incorporated the print job description in a meta-format, which is then forwarded to the document builder module 40.

The document builder module 40 may be configured to receive the processed print job data stream from the mask module 30 and scan the job for all mask delimiters. For each mask delimiter, the document building module may incorporate the correct masking instruction for its specific job type of job stream. In the process of replacing mask module 30 inserted rules with rules appropriate to the selected output device, such as print engine or visual display rules, the document builder 40 may return the print job to the native format of the print engine/display device. For each of the mask delimiters, the document builder module may be configured to incorporate the correct masking instruction for a specific output device, such as a print engine, in the native format of the output device. For example, the document builder module forwards the print job stream in the native format of the print engine for outputting on a hardcopy medium. In the case of a document which has been scanned or otherwise includes image objects, for example, a new image object may be created by the builder module which includes the masks in the appropriate locations.

In some embodiments, the system includes a detection module 42. The module 42 is configured for detection of user applied modifications the original document. In this embodiment, the user selects the text elements or other information (which may include graphics, photographs, or the like) to be masked and identifies them on the original, such as by encircling, striking out, or highlighting of textual elements. The user may be requested, e.g., via the GUI 24, to identify the type of modification applied (strikeout, highlighting, encircling etc.) and the color used in the modification. The scanned image is processed by the detection module to identify the user modifications and the associated text is tagged for masking. The detection module 42 may search the image for the color used in the modification, as identified by the user and incorporated into the print job description. The detection module may also strip out all image data which is in that color, such that when rendered, the user modifications are not visible in the document.

In one embodiment, the system 10 may further include a color highlighting module, which may be incorporated into the mask module 30 or be a separate module. The color highlighting module may highlight or otherwise accentuate text elements without hiding them from view. The color highlighting module may be configured as described in copending application Ser. No. 11/296,396, which is incorporated herein in its entirety by reference.

The various processing modules 30, 32, 34, 36, 38, 40, 42 of the system 10 may be in the form of software or hardware components and may execute processing instructions stored in associated memory 60. During processing, the print job may be stored in memory, such as memory 60 or a separate memory. The memory can be any type of device that is capable of receiving print job data and supplying data to the processing components of the system 10. For example, the memory may be embodied in a general purpose computer, a dedicated computing device, a microprocessor, a scanner processor, RAM, a PROM, an EPROM, a FLASH-EPROM, or other memory chip or cartridge, a disk drive, a tape drive, a hard disk, zip drive, CD-ROM drive, DVD drive, or other optical medium, a network server, a print server, or any other suitable device or system that is able to receive and provide data. For simplicity, it will be assumed that the memory is embodied in a computing device which may also include the processing components and may be located in the printer 12, scanner 16, or on a computer in communication therewith.

As will be appreciated, FIG. 1 illustrates a simplified block diagram of an environment in which exemplary system 10 operates. It should be readily apparent that other components may be added or existing components may be removed or modified. The functions of the system 10 may be implemented in program code and executed by a suitable computing device. The system 10 may be implemented in computer languages such as PASCAL, C, C++, JAVA, etc.

Figure 3:
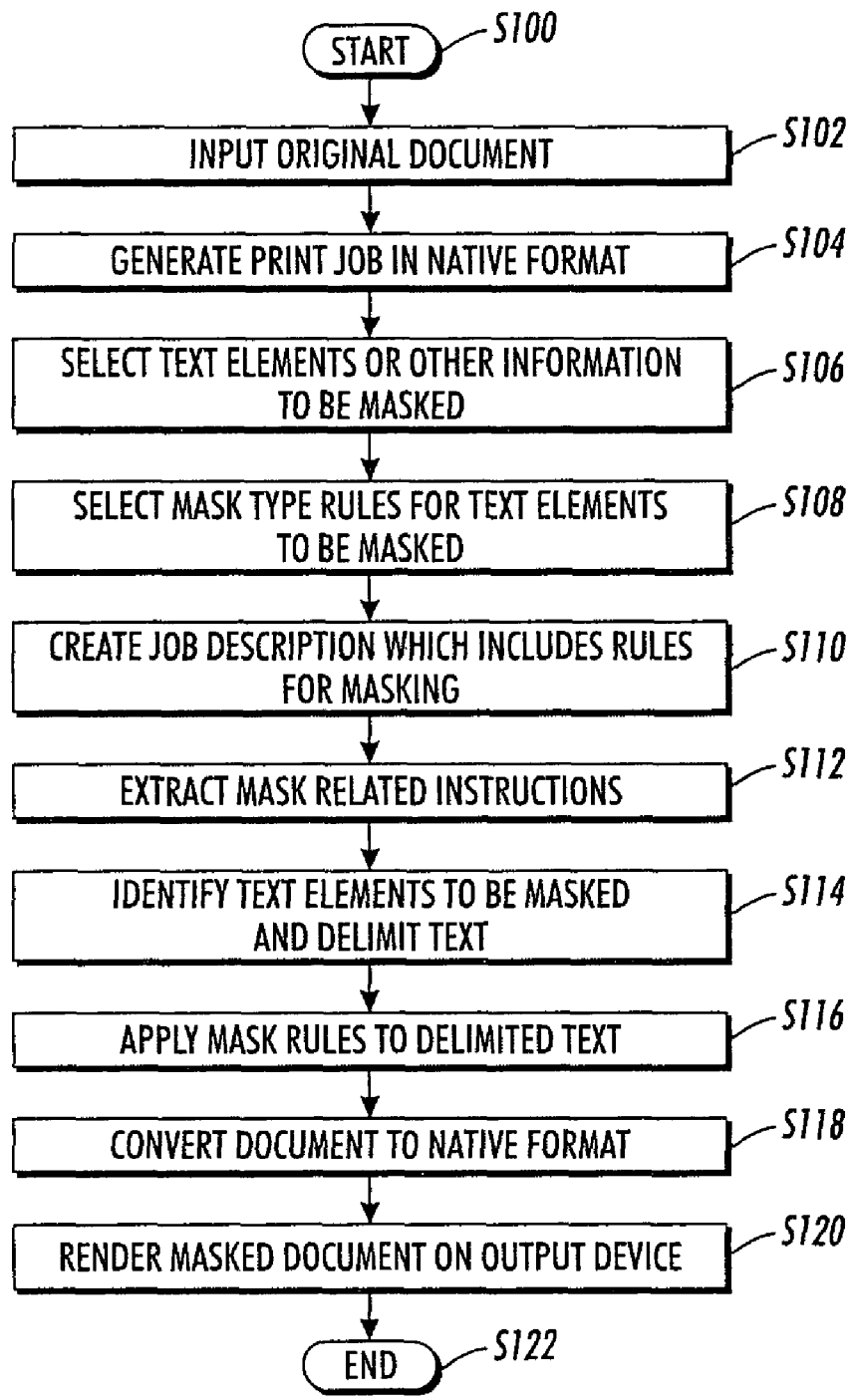
FIG. 3 illustrates an exemplary method for masking a document.

FIG. 3 illustrates a flow diagram of an exemplary method for masking text elements which may be performed with the system 10. As will be appreciated, the method may include fewer, more, or different steps from those illustrated and may proceed in a different order from that shown. The method begins at S100.

At S102, a document to be masked is input to the job generator. In the exemplary embodiment, a user has an existing document in an electronic, hardcopy format or scanned version thereof. In the case of a hardcopy original document, the inputting step may include scanning the document and transmitting the scanned document to the job generator. In the case of a digital document, the document may be input directly to the job generator.

At S104, a print job is generated based on the input document in a native format for the selected output device 12.

At S106, text elements to be masked may be selected. For example, at S106 a user may interact with the GUI to identify text elements to be masked. In one embodiment, the user may view the input document on screen and highlight text elements for masking, e.g., by dragging the cursor over the text elements to be masked. Or, the user may select textual elements from the lexicon and/or a category of text elements to be masked. In some embodiments, these categories may be in the form of look-up tables, linked lists, or other similar terms. The associated terms in the lexicon become a rule to be processed by the document parser module 36, which may be configured to search for terms in the category.

In yet further embodiments, the user may select those items which have been manually highlighted on the originally document or on a physical copy thereof and identify the type of manual highlighting which was used. Rules concerning selection of text elements may be stored and used on multiple documents. In this embodiment, the parser searches for the manually highlighted items and identifies them. Subsequently, the item indication marks may be removed from the document by suitable image processing software.

In some embodiments, specific text elements to be masked may be predefined and may be automatically incorporated into the job description. The parser may automatically search for these elements and identify them.

In some embodiments, the selection step (S104) may include defining rules for parsing the document to identify text elements which are responsive to more complex semantic rules. For example, if a user selects to mask information in a "financial" category, the rules instruct the parser to search for relevant terms in the category and apply rules to distinguish the terms from similar terms which are not required to be masked. For example, a financial category may include terms for assets, financial numbers, losses, or other similar type of financial information. A document may contain page numbers which are distinguished from sales figures, for example, by applying rules concerning font, location of the term, or other distinguishing features. In searching for person names, the parser may search for titles, such as Mr., Dr., and so forth whereby the associated person name may be located.

In some embodiments, the selection of textual elements may proceed automatically, or semi-automatically, for example, by having a user review the automatically selected text elements on screen and confirm their selection.

At S108, the user may select mask type rules for applying certain types of mask to the highlighted or otherwise selected text elements, for example, by selecting mask colors. Alternatively, colors may be specified by default rules. The selected rules may be subsequently loaded by the mask module. As a non-limiting example, for "mask in blue" a rule may be formulated as: <emphasis=mask, color=blue>.

At S110 a job description is created for the print job, which in the exemplary embodiment, includes rules for masking based on the user selections. These rules may be embedded in the document or attached thereto as a file header. In some embodiments, the instructions may be incorporated in a glyph or other mark printed on the hardcopy document. The following steps may be implemented for all documents. Alternatively, they may be implemented only for selected documents, e.g., when initiated by a user or by application of certain default rules.

At S112 any mask-related rules in the job description associated with the document may be extracted. For example, the parser extracts rules associated with the print job description.

At S114, the document may be processed to incorporate delimiters which specify the text elements to be masked and rules for masking these elected text elements. The parser searches the data stream in the print job and inserts the appropriate rule and delimitate the rule. For example, if the user has specified a category "Doctors," the parser may modify the data stream at the point where it identifies Dr. R. Smith, using the meta form: <emphasis=mask, type=A>Dr. R. Smith<end mask>.

At S116, the mask module processes the data stream in accordance with the rules applied by the parser. For example, the mask module strips the delimiters and identifies rule "mask type A" as "replace and mask in blue." The text element "Dr. R. Smith", for example, is thus stripped from the data stream and replaced with a blue box of the same shape and size.

At S118 the builder module 40 takes the document output at S116 and places it In a format suitable for rendering on an output device, if the document is not already in a suitable format. In general this step results in returning the document to the native format in which it was placed at S104.

At S120, the modified document, including masks, is output on the output device. In one embodiment, the output device prints the document with each instance of the specified text element masked in the desired color. In another embodiment, the scanned hardcopy is displayed on a recipient's computer screen with the specified elements masked in the desired color.

The method ends at S122. Further details on a specific implementation of some of these steps may be obtained from application Ser. No. 11/296,396, incorporated by reference.

The method illustrated in FIG. 3 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

This exemplary system and method find application in a variety of different contexts. In one embodiment, masking of text is used to assist the owner of documents in complying with existing privacy compliance and standards such as HIPPA, in areas where paper is important, while leaving access to the relevant information. The masking may depend on the recipient's permissions, and various items might be visible or hidden to various recipients. For example students, government employees, or other researchers may be able to search archived medical documents, such as patient records, contracts, and the like that would otherwise be hidden to them. The documents being searched would then be displayed on screen, with text elements, such as patient names, doctor names, hospital names, pathologies, and the like masked in different colors for easier interpretation. At the same time, members of the medical staff may be able to display these documents or print them with more information available, based on their individual permissions. Without the masking of the confidential information, such documents would normally have been hidden and inaccessible to any of these recipients.

In another embodiment, the system and method may be used to eliminate a certain vocabulary for specific audiences. For example, the system 10 may be used to mask a category comprising obscene language in printed documents intended for children or in displayed web pages.

The exemplary system and method may also be used in the distribution of electronic or printed documents to a number of recipients where some information need not or should not be disclosed to all people. For example, a sales report or financial paper may be masked for some but not all recipients. For a sales report where the overall document is useful to a team of recipients, except for the individual results of team members, that specific section may be masked to display only the recipient team member's achievements.

The original document is unaffected by the masking process; only the hardcopy output or display contains the masked text.

The system and method provide the capability of leaving access to sensitive but otherwise interesting documents (whether printed or scanned) to readers by removing the sensitive information on the document itself. In some instances, it can also improve in the readability of certain documents by masking irrelevant information, in order not to distract the user.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for masking text in an output document, comprising: providing a print job comprising an original document formed by scanning a hardcopy document comprising user applied highlighting; providing a print job description for the print job, the print job description including instructions for selecting text elements to be masked, the instructions including instructions for identifying user applied highlighting of text elements in the print job; modifying the print job in accordance with the print job description; removing the user applied highlighting from the print job; rendering the modified print job, from which the user applied highlighting has been removed, on an output device, whereby a selected text element is masked, the original document being unaffected by the masking process; and wherein the print job is provided in a native format and the modifying of the print job includes forming a modified print operation in a meta-format in response to the print job description, the method further comprising submitting the modified print operation in the native format to the output device.

2. The method of claim 1, further comprising:
generating the print job description based on at least one user-selected category of text to be masked.

3. The method of claim 1, further comprising:
processing the print job using optical character recognition; and
identifying the text element to be masked in the OCR-processed print job.

4. The method of claim 1, further comprising semantically processing the print job to identify text elements in accordance with the instructions.

5. The method of claim 1, wherein the output device comprises a printer.

6. The method of claim 1, further comprising generating the print job by scanning the hardcopy document.

7. The method of claim 1, wherein the applying a mask to a text element includes overlaying the text element with an opaque strip.

8. The method of claim 7, wherein the instructions include a rule which selects a color for the opaque strip.

9. The method of claim 1, wherein the applying a mask to a text element includes removing the text element from the print job.

10. The method of claim 7, wherein the applying a mask to a text element includes replacing the text element with strip of substantially the same size as the text element whereby the layout of the print job is retained.

* * * * *